United States Patent
Geertman

(10) Patent No.: US 7,128,940 B2
(45) Date of Patent: Oct. 31, 2006

(54) USE OF CARBOHYDRATE-BASED METAL COMPLEXES IN NON-CAKING SALT COMPOSITIONS

(75) Inventor: Robert Michael Geertman, Arnhem (NL)

(73) Assignee: Akzo Nobel N.V., Arnhem (NL)

( * ) Notice: Subject to any disclaimer, the term of this patent is extended or adjusted under 35 U.S.C. 154(b) by 433 days.

(21) Appl. No.: 10/623,573

(22) Filed: Jul. 22, 2003

(65) Prior Publication Data

US 2005/0079273 A1 Apr. 14, 2005

Related U.S. Application Data

(60) Provisional application No. 60/402,019, filed on Aug. 8, 2002.

(51) Int. Cl.
*A23L 1/237* (2006.01)
(52) U.S. Cl. .................. 426/649; 426/74; 426/506; 426/519; 426/656; 426/658
(58) Field of Classification Search ................ 426/74, 426/649, 656, 658, 506, 519
See application file for complete search history.

(56) References Cited

U.S. PATENT DOCUMENTS

| | | | |
|---|---|---|---|
| 2,183,173 A | 12/1939 | Segura et al. |
| 3,777,007 A | 12/1973 | Gould et al. |
| 4,192,756 A | 3/1980 | Mondshine |
| 4,786,510 A | 11/1988 | Nakel et al. |
| 4,786,518 A | 11/1988 | Nakel et al. |
| 6,491,964 B1 | 12/2002 | Setz et al. |

FOREIGN PATENT DOCUMENTS

| | | |
|---|---|---|
| DE | 3 844 065 A | 12/1988 |
| FR | 2063578 Q | 10/1969 |
| GB | 908017 | 10/1962 |
| JP | A 56 014494 A2 | 7/1979 |
| SU | 1 063 799 A | 9/1982 |
| SU | 1 117 281 A | 5/1983 |
| WO | WO 00/59828 | 10/2000 |
| WO | WO 00/73208 A1 | 12/2000 |
| WO | WO 01/25365 A1 | 4/2001 |

*Primary Examiner*—Helen Pratt
(74) *Attorney, Agent, or Firm*—Oliff & Berridge, PLC

(57) ABSTRACT

The present invention relates to a non-caking salt composition wherein the salt is an inorganic salt, comprising a transition metal complex or an aluminium complex of a (derivatised) carbohydrate as a non-caking agent. Transition metals which can be used according to the present invention are transition metals capable of forming octahedral mixed chloride-oxide structures. The non-caking salt compositions according to the invention can be used as table salt, road salt, or in electrolysis operations.

11 Claims, No Drawings

USE OF CARBOHYDRATE-BASED METAL COMPLEXES IN NON-CAKING SALT COMPOSITIONS

This nonprovisional application claims the benefit of U.S. Provisional Application No. 60/402,019, filed Aug. 8, 2002.

The invention relates to a non-caking salt composition wherein the salt is an inorganic salt, comprising a carbohydrate-based metal complex as a non-caking agent, to a process of making such a non-caking salt composition, and to the use of such a non-caking salt composition.

Many inorganic salts tend to form large, agglomerated masses upon exposure to moisture, particularly during long periods of storage. These hardened masses are generally referred to as cakes. A non-caking agent is often added to the inorganic salt to prevent the formation of cakes. For instance, alkali, alkaline earth, and aluminium silicates, silica, aluminium oxide, magnesium oxide, calcium oxide or alkaline earth carbonate are generally used for this purpose. However, a major disadvantage of these types of additives is that they must be used in relatively large amounts in order to be effective. It is also generally known that sodium or potassium ferrocyanide can be used as a non-caking additive. However, a major disadvantage of these compounds is that they contain nitrogen. The presence of nitrogen in salt compositions is highly undesired, because when the salt is used in electrolysis operations, due to the formation of $NCl_3$, explosive gas mixtures are obtained.

In recent years much effort has been put into the development of improved non-caking salt agents which are effective in small amounts, and which are inexpensive and environmentally safe.

WO 00/59828, for instance, describes the use of a metal complex of a hydroxypolycarboxylic compound, e.g. tartaric acid, as a non-caking agent in salt compositions. U.S. Pat. No. 6,491,964 and GB 908,017 disclose that iron ammonium hydroxypolycarboxylic acid complexes such as iron ammonium citrate can be used as anti-caking additives.

Carbohydrates can be used as non-caking agents as well. Their use in non-caking salt compositions has a number of advantages. They are readily available, environmentally safe, and food grade.

In U.S. Pat. No. 3,777,007, for example, it is disclosed that mono- and di-saccharides such as sucrose, lactose, maltose, dextrose, fructose, mannose or arabinose are effective non-caking agents when mixed with inorganic salts such as sodium nitrite, ammonium bicarbonate, and ammonium chloride.

WO 01/25365 discloses the use of a non-caking agent comprising a saccharide. The described non-caking agent further comprises a protein, a salt comprising an alkali metal or an alkaline earth metal salt, and an acid. The saccharide can be a monosaccharide or a polysaccharide such as fructose, glucose, lactose, maltose, sucrose, water-soluble cellulose derivatives, guar gum, pectin or gum Arabic. The protein preferably comprises a prolamine. The alkali metal or alkaline earth metal salt is a chloride, carbonate, sulfate, silicate or a combination thereof. Particularly useful salts are sodium, magnesium and/or calcium salts. The acid used in the non-caking composition preferably is citric acid or ascorbic acid.

It is an object of the present invention to provide an effective non-caking agent for inorganic salts which is commercially attractive, readily accessible, effective in relatively low dosage, and preferably food grade.

Surprisingly, we have now found that it is possible to produce effective, readily accessible non-caking salt compositions wherein the salt is an inorganic salt, comprising at least one carbohydrate-based metal complex as a non-caking agent, wherein at least part of the metal in said complex is selected from the group consisting of aluminium and transition metals which are capable of forming octahedral mixed oxide-chloride structures. The raw materials for the formation of these non-caking agents are inexpensive and readily available, which makes these additives commercially attractive. Furthermore, the carbohydrate-based metal complexes according to the present invention have the advantage that they can be used in relatively low amounts.

The inorganic salt present in the non-caking salt composition preferably is $NH_4Cl$, $CaSO_4$, $SrSO_4$, $MgCl_2$, $KCl$, $Na_2SO_4$, $NaCO_3$ or $NaBr$, but most preferably, it is predominantly sodium chloride. The term "predominantly sodium chloride" is meant to denominate all types of salt of which more than 50% by weight consists of NaCl. Preferably, such salt contains more than 90% by weight of NaCl. More preferably, the salt contains more than 92% by weight of NaCl, while a salt of more than 95% by weight of NaCl is most preferred. The salt may be rock salt, solar salt (i.e. salt obtained by evaporating water from brine using solar heat), salt obtained by steam evaporation of water from brine, and the like. Preferably, it is a subterraneous salt deposit exploited by means of dissolution mining. If the salt contains less than 0.5% by weight of water, said salt is called "dried salt".

The term "wet salt" as used throughout the specification is meant to denominate salt containing a substantial amount of water. Preferably, it is a water-containing salt of which more than 50% by weight consists of NaCl. More preferably, such salt contains more than 90% by weight of NaCl. Even more preferably, the salt contains more than 92% by weight of NaCl, while a salt being essentially NaCl and water is most preferred. The wet salt will contain more than 0.5% by weight, preferably more than 1.0% by weight, more preferably more than 1.5% by weight of water. Preferably, it contains less than 10% by weight, more preferably, less than 6% by weight, and most preferably, less than 4% by weight of water. Typically, the salt will contain 2–3% by weight of water. All of the weight percentages given are based on the weight of the total composition. Said wet salt can be dried in conventional manners to obtain dried salt.

The carbohydrate-based metal complexes according to the present invention can be used as non-caking agents for both dried salt and wet salt.

The preferred pH range of the salt composition, measured as described below, depends on the type of (derivatised) carbohydrate used. Preferably, the pH is such that the carbohydrate-based metal complex stays in solution. In general, the preferred pH range of the salt composition is 0–11. Most preferably, the pH value is less than 5. The pH can be adjusted, if so desired, by means of any conventional acid or base. The acid or base can be added separately or together with the non-caking agent.

The non-caking agents according to the present invention can comprise several types of carbohydrates. Carbohydrates are organic compounds of the approximate formula $C_x(H_2O)_y$, and for various values of x and y include sugars, starches, and cellulose. The simple carbohydrates are monosaccharides (i.e. carbohydrates which usually possess 3–9 carbon atoms), oligosaccharides (i.e. carbohydrates which usually possess 2–20 monosaccharide units), and polysaccharides (i.e. carbohydrates possessing more than 20 monosaccharide units). Preferably, complexes of a mono- or oligosaccharide are employed. By the term "carbohydrate-based" metal complexes is meant that not only the abovementioned carbohydrates can be incorporated into the non-caking metal complexes according to the present invention, but said complexes can also comprise derivatives of said carbohydrates. Derivatised carbohydrates are preferably selected from the group consisting of dehydrated carbohydrates, esterified carbohydrates, carbohydrates bearing one or more phosphate groups, one or more phosphonate groups, one or more phosphino groups, one or more sulfate groups, one or more sulfonate groups, and/or one or more amino groups, and alkali or alkaline earth salts of (derivatised) carbohydrates. More preferably, derivatised carbohydrates are selected from the group consisting of dehydrated carbohydrates, esterified carbohydrates, alkali or alkaline earth salts of said derivatised carbohydrates, and alkali or alkaline earth salts of carbohydrates. Even more preferably, the derivatised carbohydrate is an esterified carbohydrate or an alkali or alkaline earth salt of a carbohydrate. Most preferably, an underivatised carbohydrate is employed.

Examples of preferred monosaccharides are glucose, fructose, galactose, mannose, arabinose, xylose, lyxose, ribose, and their derivatives. Fructose is particularly preferred, since it forms very stable transition metal complexes. Suitable oligosaccharides comprise for instance sucrose (also known as saccharate), lactose, maltose, raffinose, and derivatives thereof. Polysaccharides which can be incorporated into the non-caking agent according to the present invention include amylose, amylopectin, cellulose, or a derivative thereof.

The (derivatised) carbohydrates can be in the open form or in the α- or β-ring form. When the ring is open, the (derivatised) carbohydrate is a ketone or an aldehyde, generally referred to as a ketose and an aldose, respectively. The literature suggests that the carbonyl group in the open ring form contributes to the complexation with transition metals or aluminium by acidifying the vicinal hydroxyl groups. Carbohydrates and derivatives thereof suitable for use in the non-caking carbohydrate-based metal complex according to the present invention do not have to be in their native form, i.e. in the open or ring form, but can also be in a reduced form. Examples of preferred reduced carbohydrates are sorbitol, mannitol, xylitol, and derivatives thereof.

Metal ions which are particularly useful in the metal-(derivatised) carbohydrate non-caking agent according to the present invention are transition metal ions capable of forming octahedral mixed chloride-oxide structures. Metals which are unable to form these octahedral mixed chloride-oxide structures often are more difficult to incorporate into the lattice, and hence they do not show a non-caking effect. Furthermore, the metal ion must form a strong complex with the (derivatised) carbohydrate, i.e. strong enough to prevent precipitation as an oxide or hydroxide. However, the complex must decompose on the salt surface and, therefore, it may not be too strong.

The determination whether or not a particular transition metal ion can be used according to the invention takes place by means of conventional molecular modelling techniques. Furthermore, for many transition metal ions, it can be found in the literature whether they have the ability to form these types of octahedral structures.

Since aluminium also has the ability to form these types of structures, carbohydrate-based aluminium complexes can be used according to the invention as well.

A transition metal which is particularly preferred according to the invention is chromium. However, iron is the most preferred transition metal for various reasons, including the fact that iron can be removed easily from brine if it is not complexed too strongly. If iron is used as the metal, both di- and tri-valent ions (ferro- and ferri-ions, respectively) are used with success. Chromium is preferably in its +3 state. The transition metal or aluminium complexes of (derivatised) carbohydrates can be mononuclear or dinuclear. In the latter case, two metal ions are complexed by two (derivatised) carbohydrate molecules. Polynuclear carbohydrate-based metal complexes can be used as well. When iron is used as the metal, dinuclear complexes are often formed. Generally, an oxo-group or a hydroxyl group forms a bridge between the two iron centres. Most preferably, an iron complex of fructose is used, since it is a commercially attractive, food grade, and effective non-caking agent.

Many iron-carbohydrate complexes have already been described in the literature. For instance, U.S. Pat. No. 4,786,510 and U.S. Pat. No. 4,786,518 describe the use of iron-carbohydrate complexes, especially iron sucrate-malate, iron sucrate-citrate, iron fructate-citrate, iron sucrate-ascorbate or iron fructate-ascorbate, for nutritional mineral supplements for food and beverage compositions. DE 3,844,065 discloses the use of glycosidic iron(II) or iron(III) complexes for pharmaceutical purposes. It is described that the iron salts of α- or β-glucose or sucrose can be used to treat anaemia.

According to a non-binding theory, when using a carbohydrate-based iron complex as a non-caking agent, the non-caking mechanism is as follows. The iron ion forms a strong complex with the (derivatised) carbohydrate molecule. Removal of a water molecule or a hydroxide ion which normally occupies one of the octahedral sites from the iron ion, or exchange of these groups with a chloride ion, enables the complex to attach to the salt surface. The next step in the non-caking mechanism is the dissociation of the complex, which is entropically favourable, at the salt surface, upon which the iron ion is released. This essentially means that part of the oxygen environment of the iron ion is replaced by a chlorine environment. Preferably, the iron ion takes up at least three chlorine atoms. How this replacement takes place differs for the {100} and the {111} salt surface. On the {100} surface, sodium and chlorine ions alternate. Therefore, the only place where three chlorine atoms are available to co-ordinate the transition metal ion is a kink position in the surface. On the {111} surface the situation is different. Here, layers of sodium and chlorine ions alternate. The favourable position to release the iron ion is now on the surface, not in a kink or step position.

Once the iron has been attached to the salt surface and the (derivatised) carbohydrate moiety released, the remaining co-ordination positions on the iron centre are filled with either oxygen or chlorine ions. The occupation of these sites by oxygen is more likely than by chlorine, since iron has a strong preference for oxygen. Furthermore, the higher charge of the oxygen reduces the number of vacancies needed in the lattice, and thus the number of defects is reduced. After this step, a pure iron oxide/hydroxide layer is formed. The result is that the original salt surface is transformed into an iron oxide surface with a much smaller lattice spacing. Therefore, it is nearly impossible to nucleate sodium chloride on the surface and the growth of large agglomerates is effectively stopped.

Comparison of the {100} surface and the {111} surface shows that the number of sites where iron can attach to the surface with an octahedral three co-ordination by chlorine is much higher on the {111} surface than on the {100} surface. It is therefore expected that the growth retardation of the {111} surface will be larger than that of the {100} surface, causing a change in morphology from cubes to octahedrons.

This change in morphology has been observed for nearly all non-caking agents based on metal ions, with the notable exception of ferrocyanide.

In a preferred embodiment, the carbohydrate-based aluminium or transition metal complex is prepared by the addition of a metal source to a solution of the (derivatised) carbohydrate compound. It was observed that when the colour of the solution changes to dark green or yellow-green, the complex has been formed and the solution is ready to use. The (derivatised) carbohydrate compound used in the complexation reaction can be in its native form, or in a reduced form. The metal source to be used to make the metal complexes of the (derivatised) carbohydrates according to the invention can be any conventional, water-soluble metal salt. Preferably, the salt is essentially nitrogen-free as in chlorides, sulfates, and the like. The metal sources which are particularly preferred comprise iron(II), iron(III) and/or chromium ions. It was observed that the presence of other metals does not remove the beneficial non-caking effect of the metal complexes according to the invention. Therefore, it is not necessary to use 100% pure metal sources. They can be combined with other metals that are less active or even inactive.

The carbohydrate-based metal complexes can be introduced into or formed in and on the sodium chloride in various conventional ways. However, a preferred way that resulted in much better control of the non-caking performance was to dissolve the metal source, the (derivatised) carbohydrate compound, and optional further components in brine. To this end, one or more metal sources and one or more (derivatised) carbohydrates are introduced into a solution of salt, preferably NaCl, optionally after the pH of said solution has been adjusted and/or buffered, with a salt concentration from 10% by weight (% w/w) to saturated. More preferably, the salt concentration in this solution is from 15 to 25% w/w. Most preferably, the salt concentration is about 20% w/w in said solution. Preferably, the metal and the (derivatised) carbohydrate are provided on the salt crystals in a conventional way by spraying a solution (preferably in brine) onto the salt. If so desired, the salt is dried further after the addition of the iron complexes of (derivatised) carbohydrates or solutions thereof.

The metal-(derivatised) carbohydrate complexes are preferably used in an amount such that less than 1,000 mg of metal is introduced per kg of the final non-caking salt composition. More preferably, less than 500 mg, even more preferably less than 250 mg, and yet more preferably less than 100 mg of metal is introduced into the final non-caking salt composition. Most preferably, the amount used introduces less than 20 mg, more preferably less than 10 mg of metal per kg of the composition, while in the embodiment preferred most of all, the amount of metal introduced is less than 5 mg/kg. Preferably, the minimum amount of metal introduced per kg of the composition is 0.1 mg, more preferably 0.5 mg, and most preferably, the minimum amount is 1.0 mg/kg.

The preferred amount of carbohydrate used in the non-caking salt composition according to the invention depends on the amount of metal used. Normally, the total amount of carbohydrate(s) used per kg of the composition is less than 600 mole %, based on the total amount of metal present per kg of composition, for carbohydrates complexing one metal ion. Preferably, less than 400 mole %, and more preferably less than 300 mole % of carbohydrate(s) is used per kg of composition, based on the total amount of metal present per kg of composition, for carbohydrates complexing one metal ion. For carbohydrates which are able to bind two or more metal ions, the preferred amounts can be easily calculated by the skilled person. Normally, more than 25 mole %, preferably more than 50 mole %, and most preferably more than 75 mole % of carbohydrate(s) is used per kg of the final non-caking salt composition, based on the total amount of metal present per kg of composition. Most preferably, the molar ratio between metal and carbohydrate is approximately between 1:1 and 1:2 for carbohydrates complexing one metal ion, and reduced proportionally for carbohydrates complexing more metal ions.

The non-caking salt compositions according to the present invention can be used as table salt, road salt, or in chemical transformations. For use as table salt, it is particularly preferred to use carbohydrate-based iron non-caking agents, since these complexes are food grade and therefore also not environmentally suspect. In another preferred embodiment, the non-caking composition according to the invention is used in electrolysis to make chlorine. A major advantage of these types of non-caking agents is that they are essentially nitrogen-free. Therefore, in electrolysis operations the formation and accumulation of explosive $NCl_3$ does not take place. Another advantage of said compounds is that the (derivatised) carbohydrate molecules do not contain $CH_2$ or $CH_3$ groups. The presence of such groups is known to result in the formation of undesired chloroform and/or other chlorinated organic compounds in electrolysis operations.

Experimental

Caking is measured in triplicate by filling a cubic copper mould of 5×5×5 cm with (treated) salt and pressing the lid at a pressure of 0.2 kg/cm². Thereafter the resulting salt cubes are stored for 4 days at a temperature of 35° C. and 40% relative humidity. The force needed to break up a fully supported cube by pressing at the top with a circular pad of 15 mm diameter is recorded. The higher the required force, the more the salt has caked.

The pH of the salt is measured in a conventional way using a mixture of 100 g salt and 25 g $H_2O$ at 21° C.

EXAMPLES

In the following experiment, ferrous sulfate heptahydrate was combined with a carbohydrate, i.e. sucrose, glucose, or fructose. Each of the carbohydrates was dissolved in a 25% NaCl solution. The resulting solutions were neutralised to pH 7 with sodium hydroxide solution and sodium carbonate solution. The solutions were stored in the dark. They were added to the salt so as to give an iron content of 10 mg per kg of salt composition or 100 mg per kg of salt composition. As can be seen in Table 1, the iron salts of sucrose, glucose, and fructose exhibit good to excellent non-caking properties compared to the blank (i.e. salt which does not comprise a non-caking agent).

From comparative entry 6 it can be derived that the mere use of fructose in an amount of 10 mg per kg of salt composition has a negative influence on the caking behaviour of the salt. Comparative entry 7 shows that when fructose is used in an amount of 100 mg per kg of salt composition, the salt is less prone to caking than when 10 mg per kg is used, but the resulting salt composition still showed undesired caking.

TABLE 1

| Entry | Carbohydrate | Metal (mg/kg) | Molar ratio metal:carbo-hydrate | Force | Force blank | Rel. force (%) |
|---|---|---|---|---|---|---|
| 1 | glucose | Fe (10) | 1:1 | 34 | 37.7 | 90 |
| 2 | sucrose | Fe (10) | 1:1 | 30 | 37.7 | 80 |
| 3 | fructose | Fe (10) | 1:1 | 26.7 | 33 | 81 |
| 4 | sucrose | Fe (100) | 1:1 | 29.3 | 37.7 | 78 |
| 5 | fructose | Fe (100) | 1:1 | 25.3 | 37.7 | 67 |
| 6 | fructose (10 mg/kg) | — | — | 45.3 | 33 | 137 |
| 7 | fructose (100 mg/kg) | — | — | 38 | 33 | 115 |

The invention claimed is:

1. Non-caking salt composition wherein the salt is an inorganic salt, comprising at least one carbohydrate-based metal complex as a non-caking agent, characterised in that at least part of the metal in said complex is selected from the group consisting of aluminium and transition metals which are capable of forming octahedral mixed chloride-oxide structures.

2. Non-caking salt composition according to claim 1 wherein the carbohydrate-based metal complex comprises at least one carbohydrate or derivatised carbohydrate which is present in its native form, or in a reduced form.

3. Non-caking salt composition according to claim 2 wherein the derivatised carbohydrate is selected from the group consisting of dehydrated carbohydrates, esterified carbohydrates, carbohydrates bearing one or more phosphate groups, one or more phosphonate groups, one or more phosphino groups, one or more sulfate groups, one or more sulfonate groups, and/or one or more amino groups, alkali or alkaline earth salts of said derivatised carbohydrates, and alkali or alkaline earth salts of carbohydrates.

4. Non-caking salt composition according to claim 2 wherein the carbohydrate is selected from the group consisting of glucose, fructose, galactose, mannose, arabinose, xylose, ribose, sucrose, lactose, maltose, sorbitol, mannitol, xylitol, amylose, amylopectin, and cellulose.

5. Non-caking salt composition according to any one of the preceding claim 1 wherein the transition metal is iron and/or chromium.

6. Non-caking salt composition according to claim 1 wherein the salt composition is predominantly a sodium chloride composition.

7. Non-caking salt composition according to claim 1 wherein the carbohydrate-based transition metal complex is an iron complex of fructose.

8. Process of making a composition according to claim 1, wherein a solution comprising
    an inorganic salt
    at least one carbohydrate-based complex of a transition metal capable of forming octahedral mixed oxide-chloride structures or a carbohydrate-based aluminium complex, and
    optionally a pH adjusting agent is sprayed onto salt, the pH of the final composition being from 0 to 11.

9. Method of salting a road, comprising using a salt composition according to claim 1 as road salt.

10. Method of salting foods, comprising using a salt composition according to claim 1 as table salt.

11. Method of performing an electrolysis process, comprising using a salt composition according to claim 1 in the electrolysis process to make chlorine.

* * * * *